United States Patent [19]

Oestreich

[11] Patent Number: 4,783,138
[45] Date of Patent: Nov. 8, 1988

[54] CABLE AND METHOD OF MANUFACTURE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 438,749

[22] Filed: Nov. 3, 1982

[30] Foreign Application Priority Data

Nov. 11, 1981 [DE] Fed. Rep. of Germany ....... 3144851

[51] Int. Cl.[4] .............................................. G02B 6/44
[52] U.S. Cl. .................................................. 350/96.23
[58] Field of Search ..................................... 350/96.23

[56] References Cited

U.S. PATENT DOCUMENTS

| 3,883,218 | 5/1975 | Slaughter | 350/96.23 |
| 4,396,446 | 8/1983 | Franken | 350/96.23 |
| 4,432,605 | 2/1984 | Niiro et al. | 350/96.23 |

FOREIGN PATENT DOCUMENTS

| 2546737 | 9/1979 | Fed. Rep. of Germany . |
| 3009406 | 9/1981 | Fed. Rep. of Germany . |
| 2355854 | 8/1982 | Fed. Rep. of Germany . |
| 2468135 | 4/1981 | France . |
| 2020085 | 11/1979 | United Kingdom . |

Primary Examiner—William L. Sikes
Assistant Examiner—Robert E. Wise

[57] ABSTRACT

A cable, particularly a cable of optical transmission elements arranged in a cable core surrounded by a covering or winding of tension supporting elements and an external cladding characterized by at least one adhesive layer disposed between the cladding and the covering or winding of tension supporting elements to form a connection between the interior of the cladding, the tension supporting elements and the cable core.

10 Claims, 1 Drawing Sheet

CABLE AND METHOD OF MANUFACTURE

BACKGROUND OF THE INVENTION

The present invention is directed to a cable particularly a cable of optical waveguides in which the cable core of the optical transmission elements is surrounded by a covering or winding of tension supporting elements to relieve tension applied to the cable and the entire core and winding is covered by an external cladding or jacket.

An electrical or optical transmission cable, which has a core of transmission elements which is wrapped in a foil which carries tension supporting or resistant elements and is surrounded by an external plastic cladding or jacket, is known and an example is disclosed in German OS No. 28 18 297. In this arrangement, a series of connections are established between the interior of the cladding and each of the tensile supporting elements. To accomplish this, an additional or second foil is provided between the cladding and the tensile supporting elements and is either arranged to provide spaced exposure of the elements or has openings in the foil to expose the tension supporting elements. Thus, when the plastic cladding is extruded onto the additional foil which surrounds the tension supporting elements and core, the material of the cladding can come into contact with the tension supporting elements to form the spaced connections.

In the case of many sensitive cables, particularly in the case of optical waveguide cables or in the case of cables subjected to high tension forces, it happens that during a drawing-in operation such as drawing the cable during installation, the cladding is drawn in an axial direction a greater amount than the core. This is particularly true if the drawing-in operation utilizes a cable grip or a clamping operation on the end of the cladding to pull the cable in cable runs. Following termination of the drawing operation, the cladding, primarily in the end region, will again shrink back and thus exerts an upsetting or compressive force on the conductors or transmission elements of the cable core. This compressive force will result in an undesirable occurrence, particularly the formation of gaps, buckling or bending and the like. In the case of optical waveguide conductors, the buckling or bending can either lead to undesirable transmission behavior or damage the transmission behavior.

SUMMARY OF THE INVENTION

The present invention is directed to providing a cable which has a core of transmission elements surrounded by a tension relief means and an external cladding which cable avoids in a simple fashion the undesirable large over-stretching of the cladding relative to the core which would occur during a drawing-in operation of installing the cable in cable runs.

To accomplish this goal, the present invention is directed to an improvement in a cable having a cable core of transmission elements, tension relief means for supporting tension forces applied on the cable core, said tension relief means being formed of tension supporting elements such as fibers spun onto the core or strips wrapped onto the core and an external cladding surrounding the core and the tension relief means. The improvements comprise adhesive means for establishing a connection between the inner surface of the cladding, the cable core and the tension relief means, said adhesive means being at least one layer of an adhesive interposed between the tension relief means and the cladding.

Since a relatively securely adhering connection exists between the cladding and the tension-resistant means and also between the tension-resistant means and the cable core due to the adhesive, the cladding can virtually not move in relation to the cable core and the tension-resistant means during a drawing-in or pulling operation while installing the cable in cable runs. Thus, in the end region of the cable, no undesirable great stretching or extension of the cladding will occur. In addition, following the drawing-in operation, a shrinking-back of the cladding with a corresponding possible damage or impairment to the cable core will not occur. Simultaneously, it is insured that no annular clearance occurs between the cladding and the cable core so that the longitudinal tightness can be improved.

The invention also relates to a method for the manufacture of the cable which includes providing the core of transmission elements, providing the tension relief means, applying adhesive means and then subsequently applying the cladding. Preferably, the cladding is applied by passing the core with the tension relief means and the adhesive means through an annular extrusion die which extrudes the cladding as a tube onto the core and draws it into tight engagement with the moving core.

DESCRIPTION OF THE PREFERRED EMBODIMENTS

Figure 1:
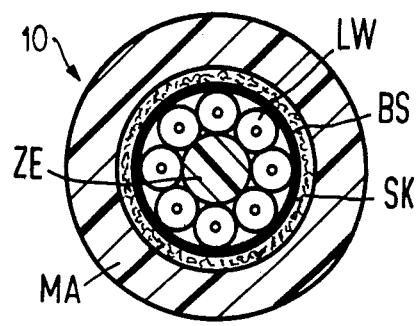
FIG. 1 is a cross-sectional view of a construction of an optical waveguide cable in accordance with the present invention.

The principles of the present invention are particularly useful in optical waveguide cables generally indicated at 10 and shown in cross-section in FIG. 1. The cable 10 has a cable core which is composed of a plurality of transmission elements LW which are stranded together. As illustrated in FIG. 1, eight optical waveguide conductors LW are provided and are stranded onto a central core ZE which is a tension-supporting core or element. The individual optical waveguide conductors LW can be designed in the form of so-called hollow conductors or in the form of filled conductors. The remaining wedge-shaped space or gussets between the optical waveguide conductors LW and the element ZE are expediently closed by a filling compound so that the cable becomes longitudinally waterproof. A tension-resistant supporting tension forces applied to the cable 10. The tension relief means BS can be a spun covering of tensionproof fibers. For this purpose, advantageously glass fiber threads or synthetic plastic threads such as made of Aramide-aromatic polyamide can be utilized. Instead of a spun covering, it is also possible to wind tension-supporting bands or strips to form the tension relief means.

On the external surface of the tension relief means BS, an adhesive means, which is illustrated as a single adhesive layer SK, is applied. Preferably, the adhesive layer is a hot-sealable glue. When the stranded units forming the cable core is overfilled by a filling compound and this filling compound exhibits a different consistency than the adhesive SK, it is then expedient to strip off the filling compound prior to the application of the adhesive so that the spun covering forming the tension relief means BS as well as the cable core will be exposed to access by the adhesive.

The cable 10 includes an exterior cladding MA. The cladding MA is preferably applied by being extruded onto the cable core having both the tension relief means and the adhesive means as it passes through an annular extrusion die and the tube of the cladding or jacket is then stretched or pulled down onto the adhesive layer. The result thereby is a firm and stable connection between the adhesive layer SK and the interior surface of the cladding MA as well as a connection of the tension relief means through the adhesive layer SK while a looser adherence is obtained relative to the cable core. Thus, tensile forces, for example, which are created during the installation of the cable in a cable run by a pulling or a drawing-in process, will act not only on the cladding MA but are also transferred to a great extent through the adhesive layer SK to the tension relief means BS. As a consequence, during the drawing-in operation the cable core as well as the cable cladding are stressed by tensile forces in the same fashion and the cladding MA does not or at least only to a very small extent become stripped-off from the cable core. Through this connection between the cladding and the cable core, it is possible that a drawing-in by means of a cable grip or means of a clamp engaging the cladding can be possible. Since a removal of the cladding does not occur or hardly occurs any longer, also a back shrinkage operation does not occur and as a consequence the upsetting operations, which were undesirable primarily in the case of optical waveguide cables, are avoided. The layer of adhesive SK also simultaneously leads to a sealing-off of the annular spacing between the cladding MA and the cable core.

Figure 2:
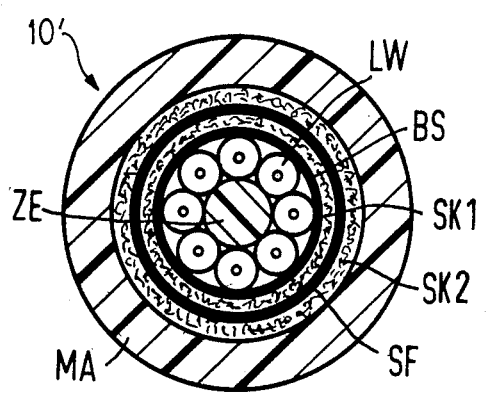
FIG. 2 is a cross-sectional view of an embodiment of the optical waveguide cable constructed in accordance with the present invention.

If an undesirable interaction is possible between the filling compound for the cable core and the cladding MA, then a modification illustrated by the cable 10' of FIG. 2 can be selected. In the cable 10', the arrangement of the stranded cable core comprising the support element ZE and the eight waveguides LW as well as the tension relief means BS is the same as in the cable 10 of FIG. 1. However, the adhesive means comprises a first or inner layer of an adhesive SK1 which is applied directly onto the tensile relief means BS, then a blocking foil SF followed by a second or outer layer of adhesive SK2. On the outer layer SK2, the cladding MA is then applied through the above mentioned extrusion and tube stretching or drawing process. The blocking foil SF can, for example, consist of polyester or a polyamide which can be applied by being longitudinally wrapped onto the inner layer SK1 and held by a retaining coil. However, it is also possible to provide a correspondingly thin metal foil, for example, an aluminum band, which is advantageous particularly in the case of conventional cables. The blocking foil SF, in contrast with known blocking foils, need not be provided with an adhesive layer on any of its sides because the adhesive layers SK1 and SK2 effect a firm, stable and reliable support mounting.

It is also possible in the case of a utilization of correspondingly flexible adhesives to fill the entire cable core entirely with the hot sealable glue. In such an instance, a stripping-off operation in the region of the tensile relief means is no longer necessary.

Although various minor modifications may be suggested by those versed in the art, it should be understood that I wish to embody within the scope of the patent granted hereon, all such modifications as reasonably and properly come within the scope of my contribution to the art.

I claim:

1. In an optical waveguide cable for use in a cable run, said cable having a cable core of optical transmission elements; tension relief means for supporting tension forces applied to the cable core and being composed of a spun covering of tension-proof fibers surrounding the core; and an external cladding surrounding the core and the spun covering of tension-proof fibers, the improvement comprising adhesive means for establishing a firm and stable connection between the inner surface of the cladding and the spun covering of tension-proof fiber, said adhesive means being at least one layer of an adhesive interposed between the spun covering of tension-proof fiber and the cladding, said adhesive layer being a heat-sealable glue so that during installation by pulling the cable into a cable run, the firm connection between the cladding and spun covering prevents excessive stretching of the cladding and the cable core may move relative to the cladding and covering.

2. In a cable according to claim 1, wherein the adhesive layer acts as a filling material for spaces in between the transmission elements of the core and the spun covering of said tension relief means.

3. In a cable according to claim 1, wherein the interior of the cable core has its spaces between transmission elements and support elements filled with a filling compound and the outer surface of the core is free of the filling compound.

4. In a cable according to claim 3, wherein the hot sealable glue fills the spaces between the transmission elements of the core adjacent the spun covering of said tension relief means.

5. In a cable according to claim 1, wherein the adhesive means include an inner layer of adhesive, a foil layer and an outer adhesive layer, said inner layer being applied directly onto the spun covering of said tension relief means and forming a connection therewith while the outer layer establishes a connection with the inner surface of the cladding.

6. In a cable according to claim 5, wherein the hot sealable glue fills the spaces between the transmission elements of the cable core and the spun covering of said tension relief means.

7. In a method of manufacturing a cable, which may be pulled into a cable run, said cable having a cable core composed of a plurality of optical transmission elements stranded together, tension relief means of a spun covering of tension-proof fibers disposed on said core for supporting tension applied to the cable, an outer cladding surrounding the core and the spun covering of the tension relief means, and adhesive means establishing a firm and stable connection between the inner surface of the cladding and the spun covering of the tension relief means, said method comprising the steps of providing a cable core of transmission elements stranded together, applying the tension relief means by applying a spun covering of tension-proof fibers on an exterior of said core, applying the adhesive means by applying at least one layer of adhesive onto the exterior of the spun covering and subsequently applying a cladding onto the arrangement with the cladding being firmly connected to the spun covering of said tension relief means by the adhesive means so that during pulling on the cladding of the cable, the firm connection between the spun covering and the cladding prevents excessive stretching of the cladding.

8. A method according to claim 7, wherein the step of applying the cladding comprises extruding the cladding as the core and tension relief means pass through an extrusion die and drawing the extruded cladding onto the core and spun covering.

9. A method according to claim 7, which further includes stripping a filling compound from an outer surface of the cable core prior to applying the spun covering and the adhesive means so that the adhesive material has access to the surfaces of the cable core.

10. A method according to claim 1, wherein the step of applying the adhesive means includes applying a first inner adhesive layer onto the spun covering of a foil layer on said first inner adhesive layer and a subsequent outer adhesive layer on the foil layer so that the adhesive means includes an inner and outer adhesive layer with a foil layer disposed therebetween.

* * * * *